United States Patent [19]

Reavell et al.

[11] Patent Number: 5,406,250
[45] Date of Patent: Apr. 11, 1995

[54] APPARATUS FOR OPERATING A SCHOOL BUS SAFETY DEVICE

[76] Inventors: James Reavell, 102 Steelwest Road; Raymond Heath, R.R. No. 4, both of Campbellford, Ontario, K0L 1L0, Canada

[21] Appl. No.: 10,644

[22] Filed: Jan. 28, 1993

[51] Int. Cl.⁶ .............................................. G08B 5/22
[52] U.S. Cl. ................... 340/433; 340/425.5; 340/480; 340/487; 116/28 R; 116/63 R; 318/434
[58] Field of Search ............ 340/425.5, 433, 480, 340/487; 116/28 R, 63 R; 318/434

[56] References Cited

U.S. PATENT DOCUMENTS

| | | | |
|---|---|---|---|
| 4,138,668 | 2/1979 | Latta, Jr. et al. | 340/433 |
| 4,339,744 | 7/1982 | Latta, Jr. | 340/433 |
| 4,559,518 | 12/1985 | Latta, Jr. | 340/433 |
| 4,766,413 | 8/1988 | Reavell | 340/433 |
| 4,816,804 | 3/1989 | Reavell | 340/487 |
| 4,916,372 | 4/1990 | Reavell et al. | 340/433 |
| 4,983,949 | 1/1991 | Wicker | 340/433 |
| 5,036,307 | 7/1991 | Reavell et al. | 340/433 |
| 5,038,136 | 8/1991 | Watson | 340/433 |

Primary Examiner—John K. Peng
Assistant Examiner—Edward Lefkowitz
Attorney, Agent, or Firm—Lieberman & Nowak

[57] ABSTRACT

A stop sign and/or crossing arm deployment system is secured to a side and/or the front, respectively of a school bus for deploying a safety stop sign and/or crossing arm between a retracted normal state and a deployed safety state. A dual power circuit is provided for providing maximum power at the instance of deployment and at the instance of final retraction. Otherwise, a lower power is used to operate a bi-directional DC motor which receives power for the entire time period between deploying and retracting the system. The system provides the lower power level while simultaneously heating the circuitry including the motor for use in cold climates. A single ground switch is used for coupling the motor directly to ground both during the deployed state and retracted state to provide maximum power in momentary cycle times to the motor. A voltage, in the reverse retraction direction of the motor, is applied to the system at all times to immediately commence the retraction portion of the cycle during deployment should the system be deployed and that decision is followed by a decision to cancel such deployment.

21 Claims, 6 Drawing Sheets

APPARATUS FOR OPERATING A SCHOOL BUS SAFETY DEVICE

BACKGROUND OF THE INVENTION

This invention relates to apparatus for deploying safety signs and/or crossing arms as used, for example, on school buses. Of interest in this area are U.S. Pat. Nos. 4,816,804, 4,916,372 and 5,036,307. Throughout the patent application various patents have been cited. The text of each and every cited patent is herein incorporated by reference.

As shown for example in the above patents or as shown in other Patents, for example, U.S. Pat. No. 4,559,518, apparatus for operating school bus safety devices, e.g., signs and arms, are well known. These apparatus include circuits and actuators for deploying a safety device such as a stop sign outwardly from the side of a stopped school bus to alert nearby motorists to stop when the bus is stopped to pick up or discharge passengers. The sign is deployed when the school bus stops and opens its door to permit passengers to alight or depart. A switch coupled to the door opens or closes in accordance with the door open and closed condition. For example, the switch typically closes when the door opens to activate the deployment apparatus.

When the door closes, the switch opens and the apparatus is caused to retract the sign, arm or other device. These apparatus may also be provided to operate a crossing arm on the front bumper to insure that the passengers on departure walk well in front of the bus. Also stop lights attached to the bus may be used in conjunction with the operation of the sign deployment mechanism as shown for example in U.S. Pat. No. 4,559,518. The lights provide further stop signals to approaching motorists.

Often, such apparatus is used in cold climates where the winter is harsh. The apparatus should be sufficiently rugged and reliable to operate in a wide assortment of climatic conditions, including high moisture, temperatures below freezing and so on. The prior art does not specifically deal with these extreme conditions and therefore such apparatus may be subject to potential failure at a critical time.

These safety devices provide an attractive target to be pushed away from such deployed position or pulled outwardly from such retracted position. In the prior art, patent 4,559,518 discloses a two way hinge spring which can be physically moved or stopped in motion. When the physical stop is removed the mechanism will deploy the apparatus to its intended position with full spring force. In U.S. Pat. Nos. 4,916,372 and 5,036,307 a breakaway link system to pivot the apparatus is disclosed. In the event of a mechanical force being applied, the drive mechanism will travel to its intended open or closed position. When the mechanical force is removed the arm will deploy or retract under full spring tension. This can be damaging to a person or to the apparatus. In U.S. Pat. No. 4,983,949 a friction clutch drive system is shown. In the event of an external mechanical force being applied, the drive mechanism continues to drive the mechanism and the clutch slips. This action can prematurely wear the components of the system.

SUMMARY OF THE INVENTION

The present invention is directed to a recognition of a need for dealing with the problems addressed above. An apparatus for operating a school bus safety device having deployed and retracted states according to one embodiment of the present invention comprises a housing adapted to be secured at a side of said bus. A bi-directional motor is secured to the housing having opposing deployment and retraction operating directions. Drive means, including link means or a friction-type slip clutch means shown, for example in U.S. Pat. No. 4,983,949 is adapted to receive the safety device and is coupled to the motor and to the housing for placing the received safety device in each of the states in response to a corresponding direction of operation of the motor. Circuit means selectively operate the motor in the opposing directions.

An apparatus according to a second embodiment comprises a housing adapted to be secured at a side of the bus. A motor is secured to the housing and has deployment and retraction operating directions. Drive means is adapted to receive the safety device and is coupled to the motor and to the housing for placing the received safety device in each of the deployed and retracted states in response to a corresponding direction of operation of the motor. Circuit means selectively operate the motor at different torques so that the torque in the deployment of the safety device is higher in the period when the deployment just commences as compared to the torque applied by the motor in the remainder of the deployment period. Similarly, the torque in the retraction of the safety device is highest at the point the retraction is completed.

In a third embodiment the motor, the adjacent circuit means, including switch means, and housing are heated to remove moisture or melt ice by a heater type resistance incorporated in the subject circuitry and to a lesser extent by the motor itself while the safety device is in the deployed state.

In a fourth embodiment, when any external pressure force is transferred to the drive means, in both the deploy and retract states, the circuit means senses this mechanical external force and checks the drive torque. This sensing is monitored through the breakaway linkage arm disclosed in the U.S. Pat. No. 4,816,804 patent. When the external force is removed the circuit means senses this change and the apparatus continues to drive the safety device at its regular torque.

DESCRIPTION OF THE PREFERRED EMBODIMENTS

Figure 1:
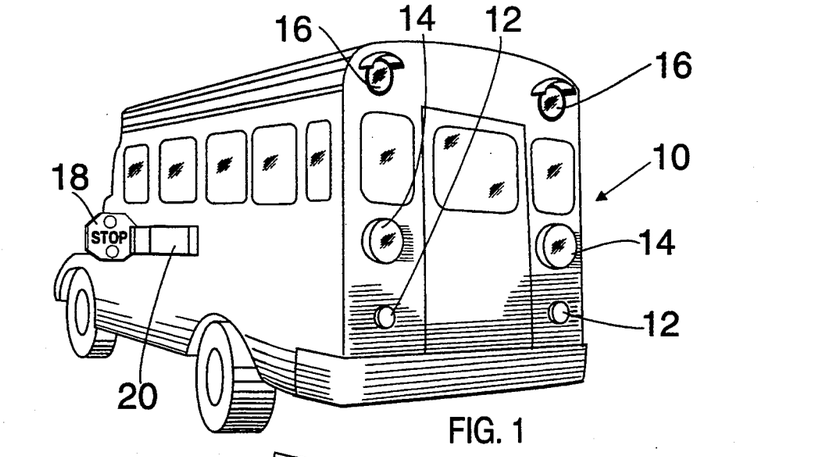
FIG. 1 is a rear perspective view of a school bus employing an embodiment of the present invention with a safety sign deployed.
Figure 2:
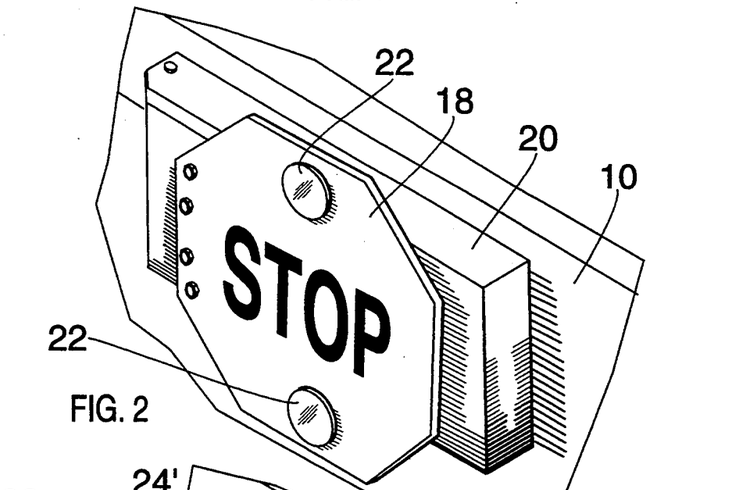
FIG. 2 is a perspective view of a retracted safety sign used in the embodiment of FIG. 1.
Figure 3:
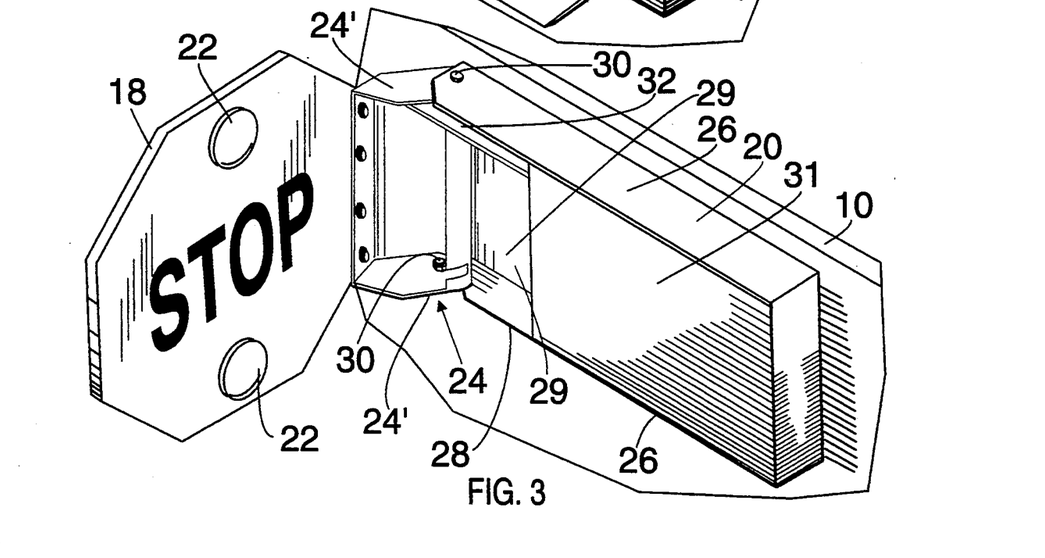
FIG. 3 is a perspective view of the deployed safety sign of FIG. 1.

In FIG. 1, a typical school bus 10 has vehicle rear lights 12 and brake lights 14. Safety stop lights 16 are lit when the school bus is stopped to take on passengers or discharge passengers and a front door (not shown) is opened. A safety device, stop sign 18, is deployed to the safety position shown from a retracted normal position of FIG. 2 by deployment apparatus 20 which also illuminates lights 16. A second set of lights 16 (not shown) are at the front of the bus. In FIGS. 2 and 3, lights 22 on the safety sign 18 are also illuminated when the sign is deployed to the position of FIGS. 1 and 3.

In FIG. 3 a bracket 24 has side walls 24' pivotally secured to respective sides 26 of apparatus 20 housing 28 via pivots 30, the housing being fabricated of stamped sheet metal or similar material. The housing 28 has a bottom wall 29. A cover 31 encloses the circuit and mechanisms (to be described below) of the apparatus 20 used to operate the bracket 24. The bracket 24 is pivoted to the deployed state of FIG. 3 and retracted state of FIG. 2 by a link assembly 32 pivotally connected to bracket 24 side wall 24'. The link assembly 32 is operated by the apparatus 20 circuit 60, FIG. 4.

Figure 4:
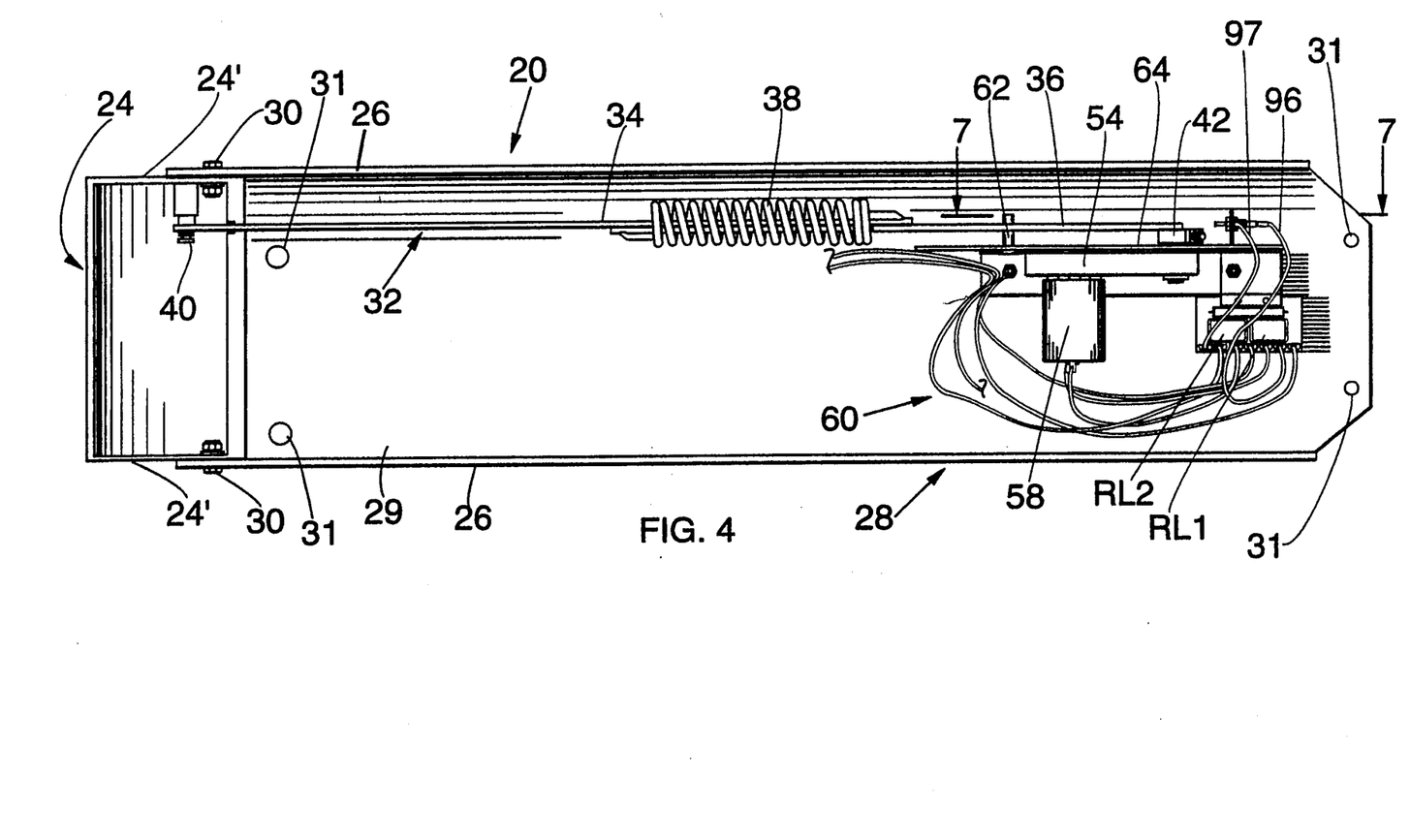
FIG. 4 is a plan view of an apparatus according to an embodiment of the present invention for deploying and retracting the safety sign of FIG. 1.

In FIG. 4, the housing bottom wall 29 is secured to a side of the bus (not shown in this FIG.) via apertures 31. The term side as used herein means the front, rear and intermediate sides of a vehicle. Link assembly 32 comprises first and second link arms 34 and 36. Arms 34 and 36 are coupled by compression spring 38 which compressively forces the link arms axially away from each other left to right in the Fig., the arms being joined to each other for sliding relative to one another in the axial left to right directions. The arms thus have a resilient connection therebetween to allow for sudden extreme forces on the bracket 24. Link arm 34 is pivoted to bracket side wall 24' by pivot 40.

Figure 7:
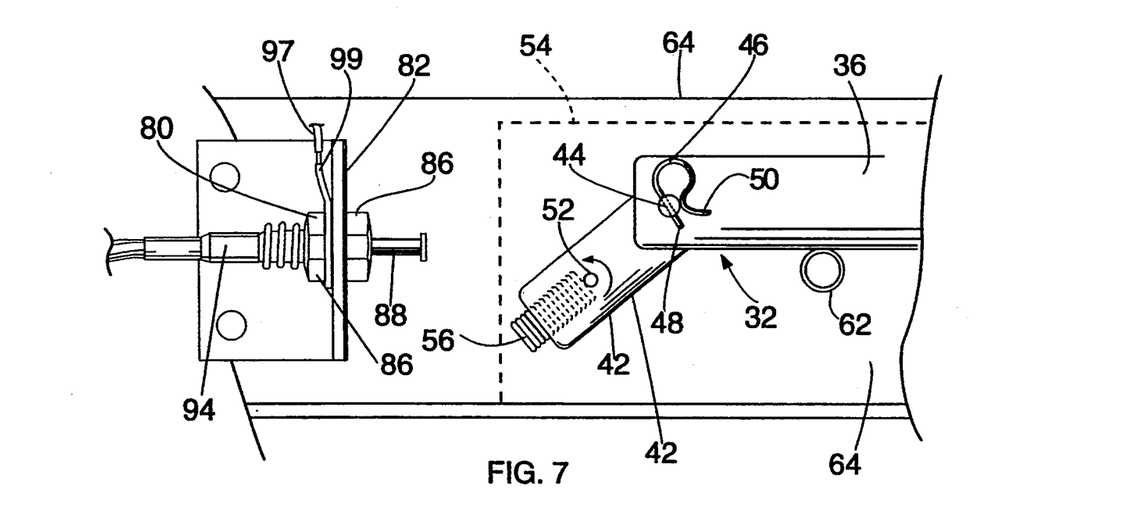
FIG. 7 is a side elevation view of a portion of the apparatus of FIG. 4 taken along lines 7—7.

In FIG. 7, the other end of link arm 36 of assembly 32 is pivotally secured to eccentric link 42 by pivot pin 44 which is fixed to link 42. A cotter pin 46 has one leg 48 passing through an aperture in pin 44 and a second leg 50 shaped to lock the pin 46 to pivot pin 44 in conventional fashion. Because leg 48 is straight and passes through a narrow close fitting aperture in pin 44 and because the cotter pin loop lies in a plane abutting the link 42 side, the cotter pin 46 has a fixed orientation relative to pivot pin 44. The pin 44, however, rotates relative to link arm 36 as link 42 rotates. Link 42 is fixed to output shaft 52 of gear box 54, FIG. 4, by set screw 56. Shaft 52 and pin 44 are spaced to form a link arm 36 drive as link 42 rotates about the shaft 52 axis.

Shaft 52 is rotated by gears in gear box 54 driven by bi-directional Direct Current motor 58, FIG. 4. Motor 58 is selectively driven in a clockwise or counter clockwise direction by circuit 60 to be described in connection with FIGS. 5a–5e. In FIG. 7, a stop 62 is secured to bracket 64 secured to housing bottom wall 29. Stop 62 limits the amount of travel of arm 36. Gear box 54 is also secured to bracket 64 as is circuit 60.

Figure 5A:
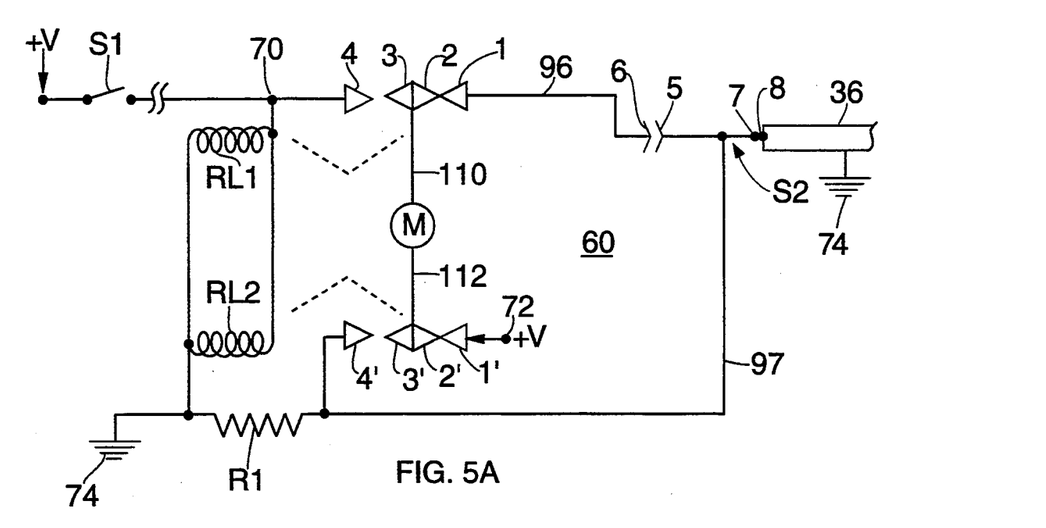
FIGS. 5a–5e are circuit diagrams illustrating different stages of the circuit at different deployment and retraction cycles of the apparatus of FIG. 4.

In FIG. 5a, circuit 60 comprises first and second terminals 70 and 72 for respectively receiving a positive voltage, +V, typically 12 volts, from a vehicle battery (not shown) When bus door switch S1 is closed terminal 70 is connected to system ground potential 74 through parallel connected coils of relays RL1 and RL2. Safety lights, such as lights 16 and 22, FIG. 1, are connected to switch S1 in the bus for illumination by +V when S1 closes the circuit to the relays RL1 and RL2. Relay RL1 has corresponding contacts 1, 2, 3 and 4 and relay RL2 has contacts 1', 2', 3' and 4'. Relays RL1 and RL2 may be identical. Contact pairs 3,4 and 3', 4' are normally open. Contact pair 2,3 are ohmically connected and contact pair 2', 3' are ohmically connected. Contact pairs 1,2 and 1', 2' are normally closed. The DC motor 58, M, is bi-directional and has a terminal 110 connected to contacts 2,3 and a terminal 112 connected to contacts 2', 3'.

Contact 4 is connected to receive +V at terminal 70 when S1 closes and contact 1' is always connected to +V at terminal 72. Contact 4' is coupled to system ground potential 74 via resistance R1 and to contact 1 through switch S2 contacts 5,6. Switch S2 contacts 5 and 7 are always ohmically connected. Contact 7 is coupled to system ground via contact 8 link arm 36.

Figure 6A:
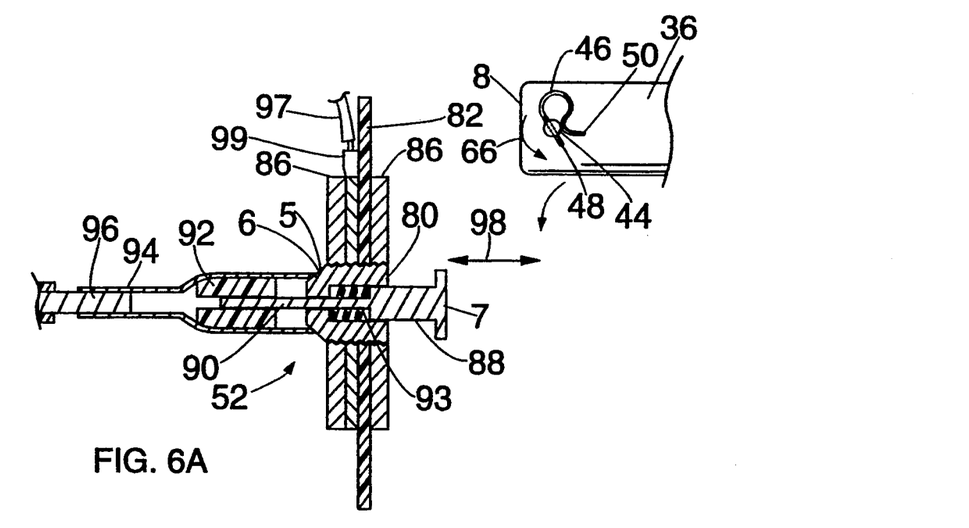
FIGS. 6a–6c are side elevation partial in section views of an actuating link and switch employed in the circuit of FIGS. 5a–5e.
Figure 6B:
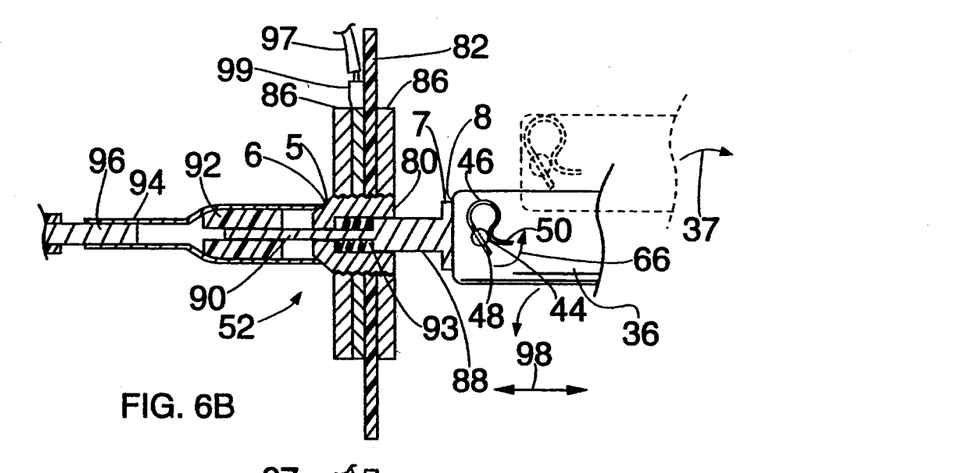
Figure 6C:
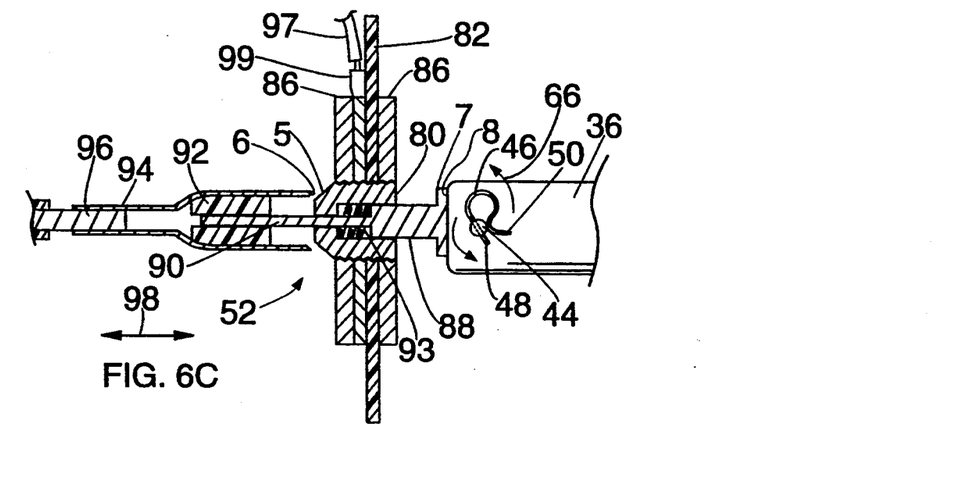

In FIGS. 6a, 6b and 6c switch S2 is shown in more detail and comprises an externally threaded electrically conductive housing 80 secured to electrically insulated bracket 82 which is secured to housing bracket 64 (FIG. 4). Housing 80 is secured by nuts 86. A wire conductor 97 is ohmically connected to housing 80 by terminal 99. Conductor 97 is shown in FIG. 5a connected between S2 contacts 5,7 and the junction between relay contact 4' and resistance R1. Contact 7 is formed by the head of an electrically conductive plunger 88 having a narrow diameter stem 90 extending therefrom. Plunger 88 is ohmically connected to housing 80 and biased to the right in the Figure by a spring 93. The stem 90 is secured to insulator 92. An electrical terminal 94 is clamped to insulator 92 and to a circuit 60 conductor wire 96 which in FIG. 5a is the conductor connected to contact 1. Contact 6 is formed by an extended circular edge of terminal 94. Contact 5 of circuit 60 is formed by a conical surface of housing 80. The switch S2 is operated by displacing the plunger 88 axially in directions 98. By displacing the plunger to the left in FIG. 6c contacts 5 and 6 are open. By displacing the plunger 88 to the right as shown in FIGS. 6a and 6b contacts 5 and 6 are closed.

The open and closed state of contacts 7 and 8 are not a function of the plunger position but of the link arm 36 position. The position of the arm 36 and switch S2 in the retracted position of the safety device, FIG. 2, is illustrated in FIG. 6c and FIG. 5a.

Figure 5B:
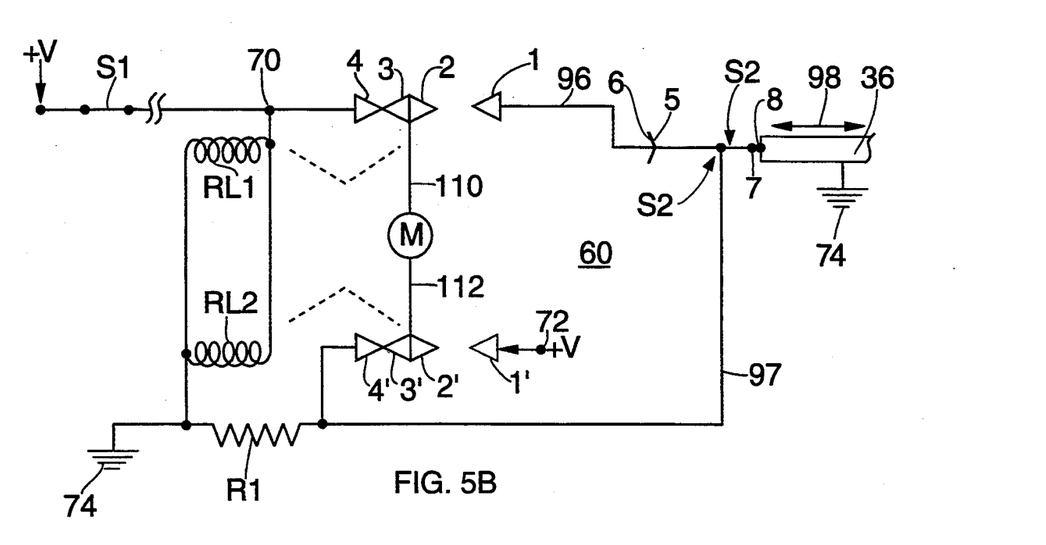

In operation, when the school bus door is opened, e.g., to receive or discharge passengers, switch S1 closes as shown in FIG. 5b. In FIG. 5b, the closed switch S1 applies power to relays RL1 and RL2 closing normally open contact pairs 3,4 and 3', 4' and opening normally closed contact pairs 1,2 and 1', 2'. This action applies power to motor M through terminal 110 to rotate the motor in one direction. In FIG. 5a, however contacts 5,6 of S2 are initially open and contacts 7,8 are closed so that current flows via conductor 97 to system ground through S2 contacts 7,8 and link arm 36. Current flows in this direction because the resistance R1 impedes current flow as compared to a direct connection to system ground.

In FIGS. 5b and 6b the link arm is initially rotated at full power because the full value of +V is applied across motor M to system ground. As link arm 36 is displaced in direction 37 by rotation of the gear box driven link 42 (FIG.7), the arm 36 disengages from plunger 88. Spring 93 forces the plunger to the right directions 98 causing contacts 5,6 to engage. However, because relay contacts 1,2 are open no power is applied to closed contacts 5,6. Switch S2 contacts 7,8 are closed in this state, FIG. 6b, and the link arm 36 is beginning to deploy from the retracted state of FIG. 6c. However, arm 36 at this time engages the plunger 88 maintaining ohmic contact therewith and thus continues to connect system ground to the motor M terminal 112 via relay contact 4'. This applies full power to the motor M which rotates at full torque and speed. If the motor is somewhat stuck due to frost in the normal retracted state, the full torque applies maximum power to free the system.

As link 42, FIG. 7, continues to rotate displacing the link arm 36 and arm 34 to the deployed state, the bracket 24, FIG. 3, opens to the position shown, deploying the sign 18 to the safety position. As arm 36 continues in this movement, FIG. 6a, the arm 36 disengages from plunger 88 opening contacts 7,8. This releases the plunger 88 so that spring 93 maintains contacts 5,6 closed as shown in FIG. 5c.

Figure 5C:
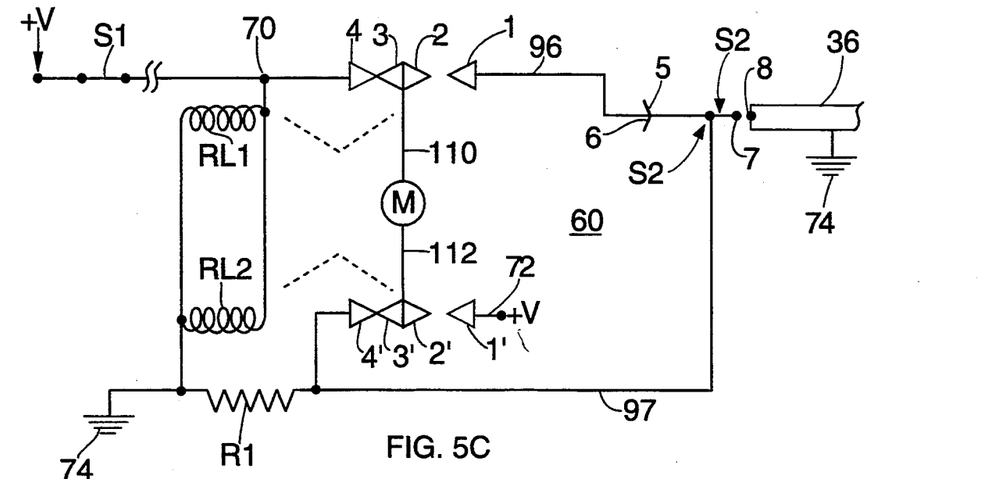

In FIG. 5c, with the contacts 7,8 open, the current through motor M now flows through resistance R1 to system ground 74. FIG. 5c is applicable to all positions of the arm 36 after it disengages the plunger 88 of S2. The resistance R1 is a heater type resistance which provides approximately 10 watts of power dissipation. The motor M is also a heat source and draws approximately 1 watt of power when, for example, in FIG. 5c operation. The resistance R1 is placed close to the switch S2 and thus along with motor M heats the motor, the adjacent circuit 60 including switch S2, and the housing 28 to dispel moisture or ice in this vicinity to free the system if stuck due to these elements. Thus initial high torque coupled by later induced heat tend to keep the system free even in unsatisfactory operating conditions. As is apparent the heat is continuously applied as long as contacts 7,8 are open.

Figure 5D:
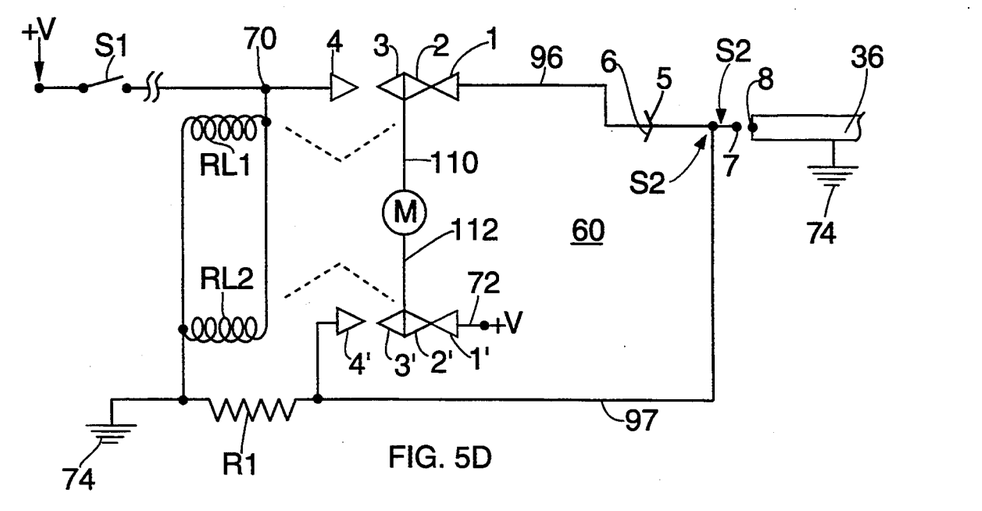
Figure 5E:
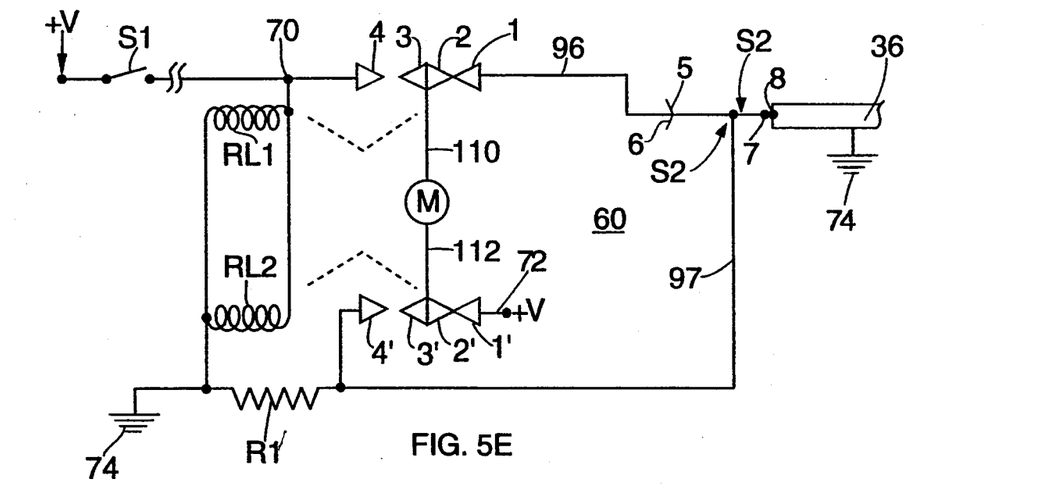

In FIG. 5d, the door has closed and switch S1 opens. The power to relays RL1 and RL2 is removed and contacts 2,3 and 2', 3' return to their normal state with contacts 1,2 and 1', 2' closed and contacts 3,4 and 3', 4' open. As described above, contacts 7,8 are open and contacts 5,6 of S2 are closed. The voltage +V applied to contact 1' now has a completed circuit path to system ground 74 via contacts 5,6 and resistance R1. This is the same power value as applied to the motor M after the contacts 7,8 opened before S1 was opened. However, power is applied through the motor M in the reverse direction since +V is applied to the motor M terminal 112. This reverses the direction of rotation of the motor M causing it to retract the link arm assembly 32 to the position from FIG. 6a to that of FIG. 6c in a reverse action to that described above.

The link arm 36 FIGS. 6a continues to retract until the position of FIG. 6b is reached at which time the contact 8 arm 36 engages the plunger 88. This couples the system ground potential 74, FIG. 5e to relay contact 4' bypassing the resistance R1, increasing the voltage across motor M, driving the motor with higher torque and speed. This action insures lock up of the system in the fully retracted position providing maximum retracting force available from the circuit to overcome potential contamination of the links and pivots of the mechanical system, e.g., ice and snow.

In FIG. 5a, the arm 36 and switch S2 are again in the fully retracted position of the safety device. Switch S2 contacts 5,6 are open and contacts 7,8 are closed. Open contacts 5,6 isolate circuit 60 from receiving +V and no current flows.

Thus a dual power system has been described for operating the safety device to the deployed safety state and the retracted normal state. Further, power is always applied to contact 1' of relay RL2, should the door be opened, the decision cancelled and the door immediately closed. This insures power is immediately applied in the reverse direction to the motor M to immediately retract the system without recycling through a given cycle as occurs in unidirectional systems disclosed for example in U.S. Pat. Nos. 4,559,518, 4,916,372 and 5,036,307 mentioned in the introductory portion. This provides a faster retraction response time to the safety deployment system. Further, since only one ground switch S2 is provided fewer mechanical parts are in circuit and thus subject to fewer potential mechanical problems than prior art systems. In addition, the circuit and motor M always receives electrical power in the deployed state, providing warming of the switch S2 and motor for operation in cold climates.

A breakaway link assembly such as assembly 32 is described in the aforementioned U.S. Pat. No. 4,816,804 and is incorporated by reference herein. This arm assembly can be used to sense external pressure on the arm assembly. When such an external pressure force is applied to, for example, safety sign 18 and transferred to link arm 34, in both the deploy and retract states, the circuit 60 senses this mechanical external force and checks the drive torque to avoid mechanical damage of the gear box of motor M. When the external force is removed from safety device 18, the circuit 60 senses this change and the motor M is still connected and continues to drive the safety device at its regular torque.

The above description is in terms of the preferred embodiments. Upon reading the subject application variations and ulterior embodiments will become obvious to one skilled in the art. These modifications are to be considered within the scope and spirit of the subject invention which should only be limited by the claims which follow and their equivalents.

What is claimed is:

1. Apparatus for operating a school bus safety device having deployed and retracted states comprising:
    a housing adapted to be secured at a side of a bus;
    a bi-directional motor secured to the housing having opposing deployment and retraction operating directions;
    a drive means for moving said safety device between said retracted state and said deployed state, said drive means adapted to receive said safety device and coupled to the motor and to the housing;
    a circuit means for selectively operating said motor in said opposing directions by sending a first electrical signal to operate the motor in a deployment direction and a second electrical signal to operate the motor in a retraction direction; and
    wherein said circuit means includes a heater means for heating said housing when the safety device is in the deployed state, said heater means comprising a resistor in circuit with said motor.

2. The apparatus of claim 1 wherein said resistor is in series with said motor so that a motor operating electrical signal has a first power value, a switch including means responsive to the position of said drive means for selectively placing a reference potential across said resistor to bypass said resistor and to apply a second power value to said motor greater than the first value.

3. The apparatus of claim 2 wherein said second power value is applied as said drive means reaches and departs said retracted state.

4. Apparatus for operating a school bus safety device having deployed and retracted states comprising:
   a housing adapted to be secured at a side of a bus;
   a bi-directional motor secured to the housing having opposing deployment and retraction operating directions;
   a drive means for moving said safety device between said retracted state and said deployed state, said drive means adapted to receive said safety device and coupled to the motor and to the housing;
   a circuit means for selectively operating said motor in said opposing directions, said circuit means including a first switch, a second switch and relay means having a normal quiescent state and an activated state, said first switch when closed activates said relay means to apply a first electrical signal to said motor to operate the motor in a deployment direction, said second switch including means responsive to the placement of the drive means in said deployed state and the successive placement of the relay means in said quiescent state from the activated state in response to opening the first switch means from the closed condition to apply a second electrical signal to said motor to operate the motor in a retraction direction;
   wherein said second switch includes means for successively altering the power level of said first and second signals during said deployment and retraction to operate said motor at higher and lower torques during each said deployment and retraction.

5. The apparatus of claim 4 including means for applying electrical power continuously to said motor during said deployment and retraction and while said safety device is in said deployed state.

6. The apparatus of claim 4 wherein the power level that produces the lower torque during deployment and retraction is marginally greater than the minimum power level necessary to deploy and retract the safety device, thereby stopping deployment or retraction of the safety device in response to external pressure and preventing motor burnout.

7. An electrically operated vehicle safety apparatus including a safety bracket for receiving a safety device having a safety deployed state and a retracted normal state, said apparatus comprising:
   a housing adapted to be secured to a vehicle with the bracket external the vehicle;
   a bi-directional Direct Current (DC) motor secured to said housing for operating in opposing directions;
   a first switch adapted to be secured to said vehicle and having a first switch condition manifesting the normal state and a second switch condition manifesting the safety state;
   an actuator secured to the housing and coupled to and operated by said motor, said actuator having a safety state and a normal state;
   said bracket coupled to said actuator and adapted to secure thereto said safety device so that the bracket and device are selectively placed in said safety and normal states by said actuator;
   a second switch responsive to the condition of said first switch for operating said motor in a first direction when the first switch is switched from the first condition to the second condition to place the actuator in the safety state and for subsequently operating said motor in a second direction opposite the first direction to place the actuator in the normal state when the first switch is successively switched to the first condition from the second condition; and
   means for applying a relatively higher electrical power value to said motor in a first period when said second switch initiates operating said motor in said first direction and in a second period when the second switch concludes operating the motor in said second direction and for applying a relatively lower electrical power value to said motor in a third period between the first and second periods, said third period comprising the time period during which the motor is operating in said first and second directions and when said safety device is in said deployed state.

8. The apparatus of claim 7 including means for applying electrical power continuously to said motor during said first, second and third periods.

9. The apparatus of claim 7 wherein said means for applying higher and lower power values includes means for applying a first voltage drop across said motor between a first voltage value and a reference value to provide said higher power value and for applying a second voltage drop across said motor less than the first drop to provide said lower power value.

10. The apparatus of claim 9 wherein said means for applying said first and second drops includes means for selectively coupling a resistor in series with said motor.

11. The apparatus of claim 10 wherein said resistor includes means for heating said housing during said lower power value.

12. The apparatus of claim 9 wherein said motor has first and second terminals, said means for applying lower and higher voltage values including a third switch responsive to the deployed and retracted state of said actuator for selectively coupling a reference potential through a resistor in series with said motor to provide the lower power value and a reference potential directly to one of said motor terminals to provide the higher power value.

13. The apparatus of claim 7 including means for receiving a voltage of a given polarity, means for applying said voltage across said motor in selected opposing polarities in accordance with the switch condition of said first switch and means for varying said voltage across said motor.

14. In an apparatus for deploying a safety device on a vehicle, said apparatus including a circuit for deploying the device to a safety state and retracting the device to a normal state, said circuit including a motor and an actuator for said deploying and retracting, the combination comprising:
   an electrically conductive actuator link at a reference potential and operated by said motor; and
   a switch selectively operated by said link and selectively ohmically connected to said link for selective operating said motor in a grounded state and an .ungrounded state, wherein, during said grounded state,
   a first voltage of a first value is applied across said motor in a first period coinciding with the commencement of said deployment and in a second period at the point the device is fully retracted, and during said ungrounded state, a second voltage of a second value lower than the first value is applied across said motor in a third period between said first and second periods, said third period coinciding with the deployment and retraction of the device, to apply a first torque to said link in said first and second periods and a second lower torque in said third period.

15. The combination of claim 14 wherein said switch comprises an electrically conductive housing, an electrically conductive plunger slideably and ohmically coupled to said housing, said plunger adapted to ohmically and operatively engage said link and a contact secured to the plunger ohmically isolated from said plunger, said switch including bias means for biasing said contact in ohmic engagement with said housing to form a normally closed switch between said contact and housing, said link for engaging said plunger for selective opening said normally closed switch in said first and second periods.

16. Apparatus for operating a school bus safety device having deployed and retracted states comprising:
 a housing adapted to be secured at a side of said bus;
 a motor secured to the housing having deployment and retraction operating directions;
 a drive means, including a link means, or moving said safety device between said retracted state and said deployed state, said drive means adapted to receive said safety device and coupled to the motor and to the housing ; and
 a circuit means for selectively operating said motor in a grounded state and an ungrounded state, wherein said grounded state corresponds to a period of commencing the deployment of the safety device such that the torque in the deployment of the safety device is higher in the period when the deployment just commences as compared to the torque applied by the motor in the remainder of the deployment period, which corresponds to said ungrounded state.

17. The apparatus of claim 16 wherein the grounded state also applies to a period at which said safety device reaches the fully retracted position, such that the torque applied by said motor in the period at which said safety device reaches the fully retracted position is higher than in the immediate prior period when the safety device is retracted from the fully deployed position.

18. The apparatus of claim 16 wherein the motor is bi-directional and has opposing operating directions for respectively operating in said deployment and retracting directions.

19. Apparatus for operating a school bus safety device having deployed and retracted states comprising:
 a housing adapted to be secured at a side of said bus;
 a bi-directional motor secured to the housing having deployment and retraction operating modes;
 a drive means adapted to receive said safety device and coupled to the motor and to the housing for placing said received safety device in each of said deployed and retracted states in response to a corresponding operating mode of said motor; and
 a circuit means for selectively operating said motor at different torques so that the torque is higher when the motor initially enters the deployment mode and concludes in the retraction mode as compared to the torque applied by the motor in the remainder of the deployment and retraction of the safety device.

20. The apparatus of claim 19 including means for applying electrical power continuously to said motor during said deployment and retraction and while said safety device is in said deployed state.

21. The apparatus of claim 5 wherein the circuit means includes a heater for heating said housing when said motor is in said deployment and retraction modes and the safety device is in the deployed state, said heater comprising a resistor in circuit with said motor.

* * * * *